Sept. 18, 1923.  
E. H. COE  
ANTISKID CHAIN  
Filed March 30, 1923  
1,468,280
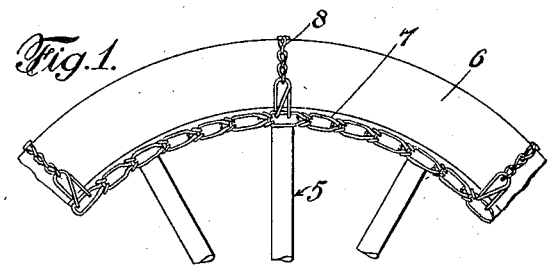
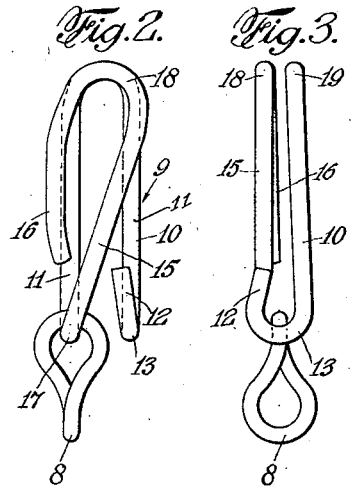 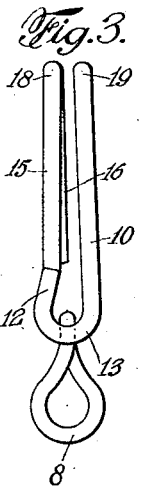 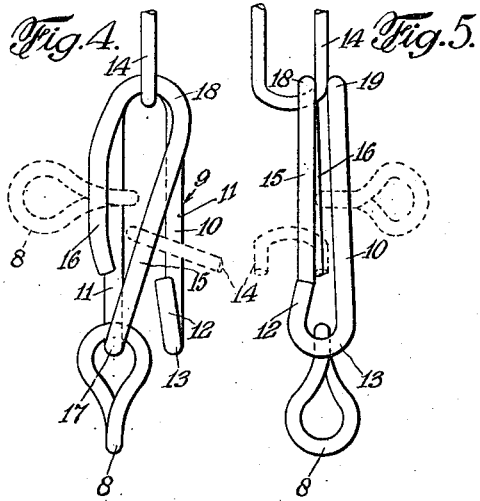 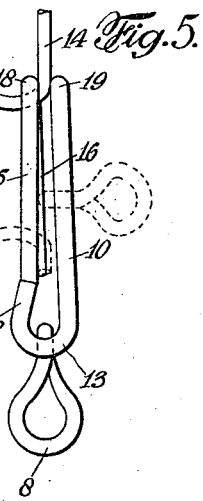
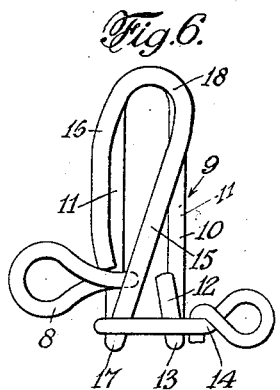 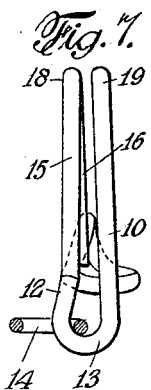 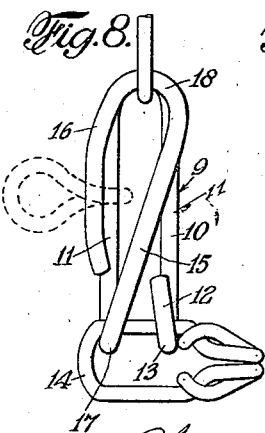 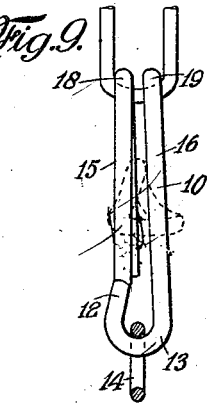
Inventor  
Elmore H. Coe,  
By his Attorneys Patented Sept. 18, 1923.

1,468,280

UNITED STATES PATENT OFFICE.

ELMORE H. COE, OF HEWLETT, NEW YORK.

ANTISKID CHAIN.

Application filed March 30, 1923. Serial No. 628,695.

*To all whom it may concern:*

Be it known that I, ELMORE H. COE, a citizen of the United States, and residing in Hewlett, in the county of Nassau and State of New York, have invented a certain new and useful Improvement in Antiskid Chains, of which the following is a specification.

This invention relates to automobile antiskid chains and more particularly to means, in the form of a link, for connecting the customary cross chains to the conventional type of side chains employed in such antiskid devices.

It is well known in the art to which my invention relates that the transversely disposed chains commonly known as cross chains, by reason of their being subjected to an excessive abrasive tread action when applied to an automobile wheel, after prolonged use become so worn, particularly intermediate their ends that they sooner or later break under tension or become unfit for further use, in which case it becomes necessary to disconnect them from their cooperative side chains and substitute new ones.

An important object of my invention is to provide a simple and efficient unitary structure of the character mentioned for expeditiously connecting the cross chains with the side chains in an anti-skid device, and also enabling the cross chains to be readily disconnected from their associated side chains, if desired.

Other objects and certain advantages of the invention will become apparent from the following description when taken in connection with the accompanying drawings in which—

Fig. 1 is a fragmental view in side elevation of an automobile wheel showing an anti-skid chain applied thereto and embodying my invention.

Fig. 2 is a face view of the link structure embodying my invention, the first step in attaching a cross chain thereto being illustrated.

Fig. 3 is an elevation of the device shown in Fig. 2 as viewed from the right therein.

Fig. 4 is a view similar to that of Fig. 2 illustrating the first step in attaching a side chain.

Fig. 5 is an elevation of the device shown in Fig. 4, as viewed from the right therein.

Fig. 6 is a view similar to that of Fig. 4 illustrating the second step incident to the attaching of the cross chain and side chain.

Fig. 7 is an elevation of the device shown in Fig. 6 as viewed from the right therein.

Fig. 8 is a view similar to that of Fig. 6 in which both the cross and side chains are shown in their ultimate respective positions.

Fig. 9 is an elevation of the device shown in Fig. 8 as viewed from the right therein.

In the drawings, wherein for the purpose of illustration, is shown what I at present consider the preferred form of my invention, the numeral 5 indicates an automobile wheel having a tire 6 associated therewith to which is applied an anti-skid device comprising side chains, one of which is indicated by the numeral 7, to which are connected at spaced intervals transversely disposed or cross chains 8.

In view of the fact that it becomes desirable after prolonged use to detach the cross chains 8 from the side chains 7 and substitute in lieu thereof new cross chains, I have provided a device illustrated in detail in Figs. 2 to 9 inclusive, which not only makes possible quick detachability and assembling of the cross chains 8 with respect to the side chains 7, but also functions effectively to retain the cross chains permanently locked to the side chains under all conditions incident to the functioning of the anti-skid device as a whole.

The device embodying my invention and adapted to be applied as shown in Fig. 1, is in the form of a link indicated as a whole by the numeral 9. This link is preferably constructed from more or less resilient material which, when fabricated, assumes the form of a yoke 10 having legs 11, the end of one of which, as shown at 12, is bent upon itself to provide a loop 13 adapted to receive a given link 14 of a side chain. The other leg is bent as shown most clearly in Figs. 2, 4, 6 and 8, to provide a relatively long shank 15 disposed at an angle with respect to the parallel legs 11. This shank is bent upon itself to provide a relatively long hook 16, the end of which terminates at a point relatively close to the shank 15 in proximity to its jointure with the leg 11 formed integral therewith. It will be noted that the construction of the device is such that the shank 15 forms with its attached leg 11, a loop 17 adapted to receive, as was mentioned in connection with the adjacent loop 13, a selected or given link indicated by the numeral 14, of a side chain. It will also be noted that the connection of the shank 15 with the hook 16 is such that at their jointure a loop 18 is formed which corresponds with an adjacent loop 19 formed intermediate the jointure of the legs 11, the loops 18 and 19 being adapted, as shown most clearly in Figs. 8 and 9, to receive the end link of the cross chain 8. It might be remarked here that the construction of the device embodying my invention is such that it is equally applicable to either end of a cross chain as a means for connecting the same to the adjacent side chain and that due to its interchangeability, it becomes unnecessary to modify the construction disclosed in order to be able to connect the other ends, not shown, of the cross chains 8 to the other side chain, which also does not appear in the drawings.

In assembling the device embodying my invention with respect to the cross and side chains, the end link of the cross chain is passed over the end 12 of the yoke 10 whereupon it is moved up one leg 11 and down the other to the position shown in Fig. 2. With the end link of the cross chain thus positioned, a selected link of the side chain is passed over the hook 16 to its full line position shown in Fig. 4. The end link of the cross chain is then moved to its dotted line position shown in Fig. 4, intermediate the hook 16 and the adjacent leg 11. With the end link of the cross chain thus positioned, the link 14 of the side chain is permitted to pass the end link of the cross chain in its movement from the full line position shown in Fig. 4, to its dotted line position shown therein. The side link 14 after having passed the end link of the cross chain 8 and upon reaching its dotted line position shown in Fig. 4, is, while the end link of the cross chain is maintained in its dotted line position shown in Fig. 4, moved further downwardly upon the shank 15 until it assumes its full line position shown in Figs. 6 to 9 inclusive, within the hooks 13 and 17. After the link 14 of the side chain has assumed its proper position within the hooks 13 and 17, the end link of the cross chain 8 is moved from its dotted line position, shown in Figs. 4 and 5, to its full line position shown in Figs. 6 and 7, whereupon it is permitted to pass over the end of the hook 16, it then being moved to its dotted line position shown in Figures 8 and 9, and subsequently to its full line position shown therein, in which position it is confined within the adjacent loops 18 and 19.

In view of the foregoing description as to the assembling of the cross and side chains, it is believed unnecessary to enter into a lengthy explanation as to the several steps necessary to effect a disengagement of either the cross or side chains from the device embodying my invention.

While I have shown what I at present consider the preferred form of my invention, it is to be understood that various changes in the shape, dimensions and proportions of certain elements entering into the same may be resorted to without departing from the spirit of the invention or the scope of the subjoined claims.

Having thus described my invention, I claim:

1. A device of the character described comprising a yoke shaped element having legs, said legs being united to form a loop, one of said legs being bent to provide a loop terminating in a shank which is bent to provide a loop coinciding with the first mentioned loop and a hook terminating in a free end, the other of said legs being bent to provide a loop coinciding with the second mentioned loop and a hook having a free end.

2. A device of the character described comprising a yoke shaped element having legs, said legs being united to form a loop, one of said legs being bent to provide a loop terminating in a shank which is bent to provide a loop coinciding with the first mentioned loop and a hook terminating in a free end, the other of said legs being bent to provide a loop coinciding with the second mentioned loop and a hook having a free end, the free ends of said hooks being disposed upon opposite sides of said shank, one of said free ends being spaced an appreciable distance from said shank.

3. A device of the character described comprising a yoke shaped element having legs, said legs being united to form a loop, one of said legs being bent to provide a lop terminating in a shank which is bent to provide a loop coinciding with the first mentioned loop and a hook terminating in a free end, the other of said legs being bent to provide a loop coinciding with the second mentioned loop and a hook having a free end, the free ends of said hooks being disposed upon opposite sides of said shank and spaced an appreciable distance from said legs, one of said free ends being spaced an appreciable distance from said shank.

4. A device of the character described comprising a yoke shaped element having legs united to form a loop therebetween, one of said legs being bent to provide a loop terminating in a shank extending from the plane of one leg to the plane of the other leg, said shank being bent to provide a loop coinciding with the first named loop and a hook disposed substantially parallel to one of said legs, the other of said legs being bent to provide a loop coinciding with the second named loop, the last named loop terminating in a hook, said hooks having free ends disposed upon opposite sides of said shank.

In testimony whereof, I have affixed my signature to this specification.

ELMORE H. COE.